United States Patent
Williams et al.

(10) Patent No.: US 12,276,520 B2
(45) Date of Patent: Apr. 15, 2025

(54) ALTITUDE SMOOTHING

(71) Applicant: EMBARK TRUCKS INC., San Francisco, CA (US)

(72) Inventors: Grady D. Williams, Oakland, CA (US); Phillip James Haeusler, San Francisco, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 0 days.

(21) Appl. No.: 18/141,042

(22) Filed: Apr. 28, 2023

(65) Prior Publication Data
US 2024/0094026 A1    Mar. 21, 2024

Related U.S. Application Data

(63) Continuation of application No. 17/949,673, filed on Sep. 21, 2022, now Pat. No. 11,644,337.

(51) Int. Cl.
*G01C 21/00* (2006.01)
*G06V 20/58* (2022.01)

(52) U.S. Cl.
CPC .......... *G01C 21/3822* (2020.08); *G06V 20/58* (2022.01)

(58) Field of Classification Search
CPC . G06F 30/13; G06F 2111/10; G01C 21/3815; G01C 21/3819; G01C 21/3822; G01C 21/3867
See application file for complete search history.

(56) References Cited

U.S. PATENT DOCUMENTS

| | | | |
|---|---|---|---|
| 2005/0251332 A1 | 11/2005 | Entenmann et al. | |
| 2014/0157175 A1* | 6/2014 | Johansson | G01C 21/3844 715/771 |
| 2021/0001877 A1 | 1/2021 | Han et al. | |
| 2022/0198935 A1 | 6/2022 | Adams et al. | |
| 2023/0016578 A1 | 1/2023 | Williams | |

FOREIGN PATENT DOCUMENTS

| | | |
|---|---|---|
| DE | 102020110269 A1 | 10/2021 |
| KR | 102248510 B1 | 5/2021 |

OTHER PUBLICATIONS

Canadian Office Action dated Oct. 10, 2023 which was issued in connection with Canadian Patent Application No. 3,213,203.
Extended European Search Report for European Patent App. No. 23198795.9, dated Apr. 9, 2024, 8 pages.
892 Form dated Dec. 2, 2022 which was received in connection with U.S. Appl. No. 17/949,673.
892 Form dated Mar. 7, 2023 which was received in connection with U.S. Appl. No. 17/949,673.
Notice of Allowance dated Mar. 28, 2023 which was received in connection with U.S. Appl. No. 17/949,673.

* cited by examiner

*Primary Examiner* — Michael J Zanelli
(74) *Attorney, Agent, or Firm* — McDermott Will & Emery LLP

(57) ABSTRACT

A system and method including receiving a digital representation of a road that includes one or more lane representations; defining a factor graph including variable nodes and constraint nodes that encode lane boundary constraints for the lane map; translating the factor graph into a nonlinear optimization problem for altitudes of the lane map; generating a solution to the optimization problem; and generating a corrected lane map with an optimized altitude for the road based on the generated solution.

20 Claims, 15 Drawing Sheets

ALTITUDE SMOOTHING

RELATED APPLICATIONS

This application is a continuation of, and claims benefit of and priority to, U.S. patent application Ser. No. 17/949,673, filed on Sep. 21, 2022, the contents of which are incorporated herein by reference in their entirety for all purposes.

BACKGROUND

Autonomous vehicles are motor vehicles capable of performing one or more necessary driving functions without a human driver's input, generally including Level 2 or higher capabilities as generally described in SAE International's J3016 Standard and including, in certain embodiments, self-driving trucks that include sensors, devices, and systems that may function together to generate sensor data indicative of various parameter values related to the position, speed, operating characteristics of the vehicle, and a state of the vehicle, including data generated in response to various objects, situations, and environments encountered by the autonomous vehicle during the operation thereof.

An autonomous vehicle may rely on sensors such as cameras, lidars, radars, inertial measurement units (IMUs), and the like to understand the road and the rest of the world around the vehicle without requiring user interaction. Accurate modelling of the road on which the autonomous vehicle operates is important so that, for example, the vehicle can safely navigate the road using the sensor readings (i.e., sensor data). Accurate modelling or estimation of the road can be critical for perception (computer vision), control, mapping, and other functions. Without proper modelling, an autonomous vehicle might have trouble staying within its lane, as well as additional problems such as steering and navigation (i.e., autonomous operations).

In some aspects, road maps including lane level information such as lane boundaries, centerlines, and other topological information may be relied upon in various autonomous operations of a vehicle. In some instances, the road maps might include or depict abrupt changes or discontinuities regarding an altitude component of a mapped road. Although included in the lane map, such discontinuities (i.e., errors) might represent a departure from the actual reality of the road that does not exhibit the discontinuity. These types of inconsistencies are unacceptable in the context of high precision and safety-critical operations of autonomous vehicles that requires a high level of accuracy and minimal mapping errors.

As such, there exists a need for an efficient and robust system and method to accurately and efficiently minimize altitude mapping errors for lane maps used for the operation of an autonomous vehicle.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
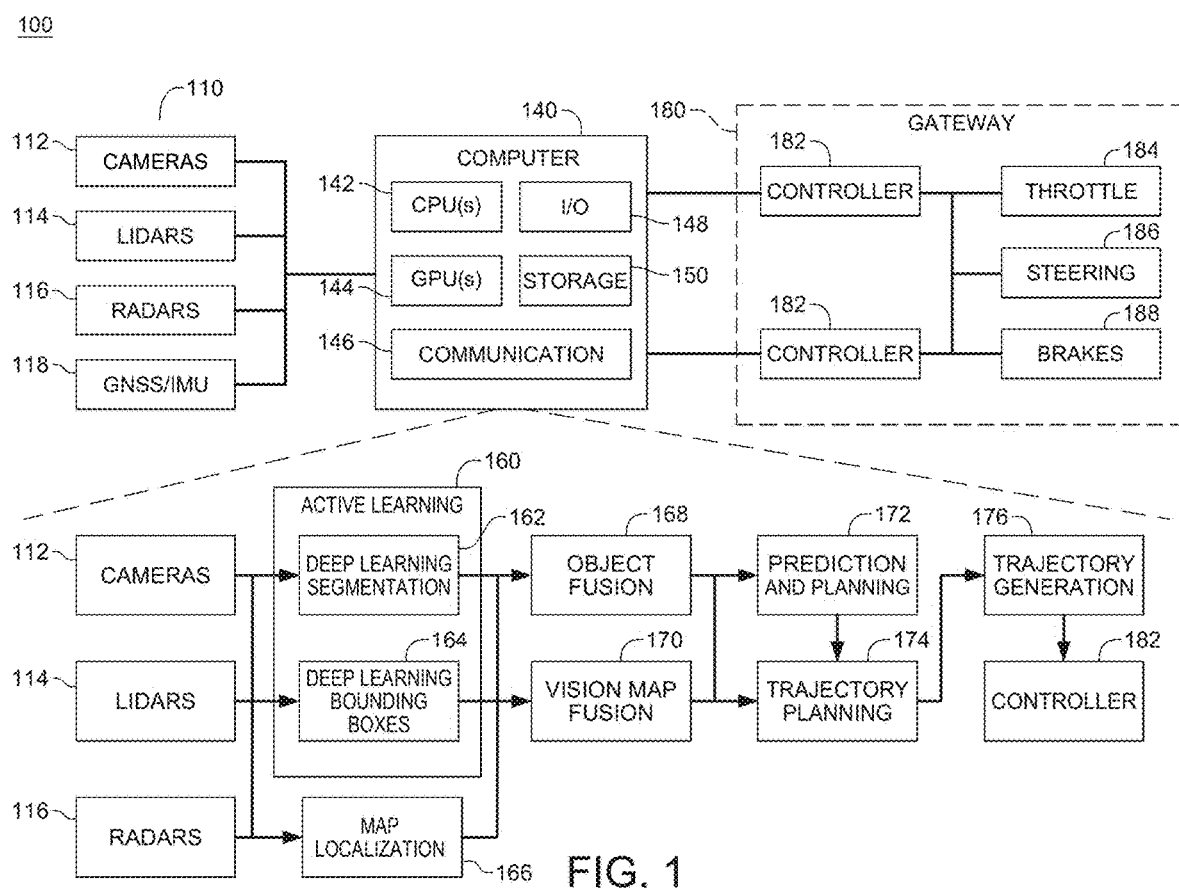
FIG. 1 is an illustrative block diagram of a control system that may be deployed in a vehicle, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. Further, as will become apparent to those skilled in the art upon reading the present disclosure, embodiments of the present invention may be used in conjunction with other types of vehicles. In general, embodiments may be used with desirable results in conjunction with any vehicle towing a trailer or carrying cargo over long distances.

Figure 2A:
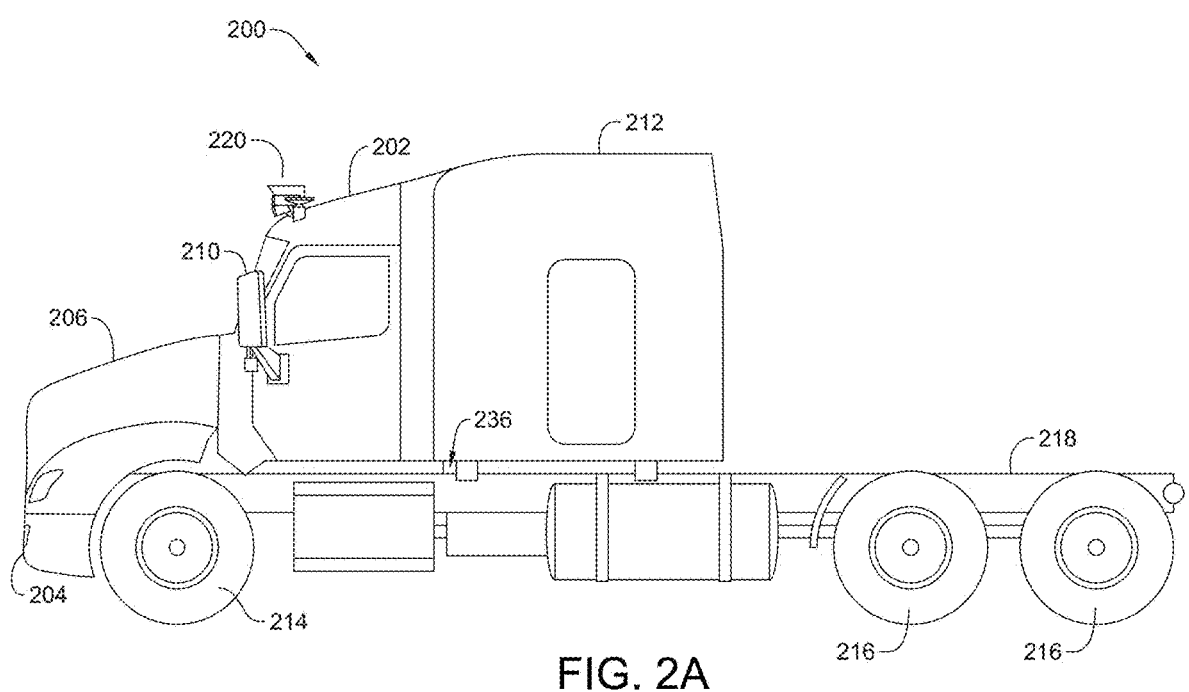
FIGS. 2A-2C are illustrative depictions of exterior views of a semi-truck, in accordance with example embodiments.
Figure 2B:
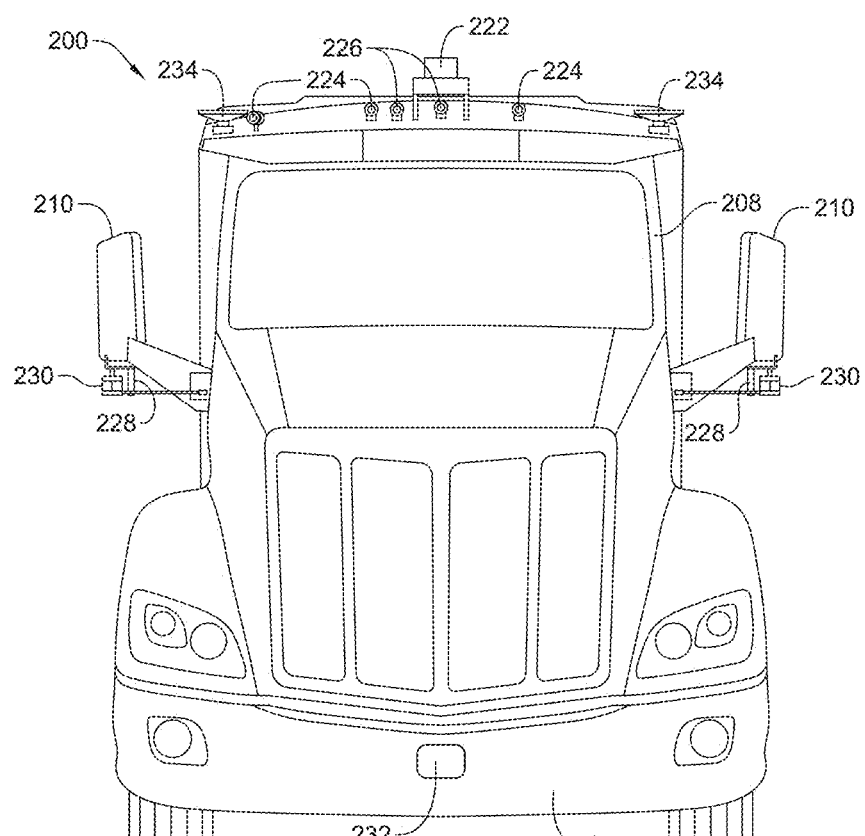
Figure 2C:
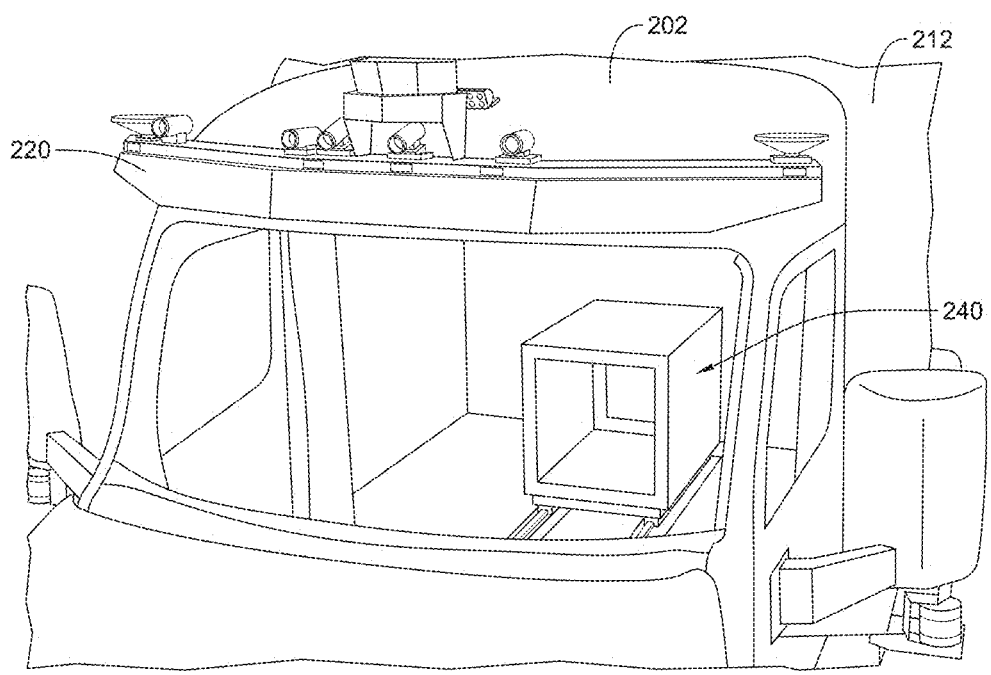

FIG. 1 illustrates a control system 100 that may be deployed in and comprise an autonomous vehicle (AV) such as, for example though not limited to, a semi-truck 200 depicted in FIGS. 2A-2C, in accordance with an example embodiment. Referring to FIG. 1, the control system 100 may include sensors 110 that collect data and information provided to a computer system 140 to perform operations including, for example, control operations that control components of the vehicle via a gateway 180. Pursuant to some embodiments, gateway 180 is configured to allow the computer system 140 to control different components from different manufacturers.

Computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of a throttle 184, steering systems 186, brakes 188 and/or other devices and systems). In general, control system 100 may be configured to operate the vehicle (e.g., semi-truck 200) in an autonomous (or semi-autonomous) mode of operation.

For example, control system 100 may be operated to capture images from one or more cameras 112 mounted at various locations of semi-truck 200 and perform processing (e.g., image processing) on those captured images to identify objects proximate to or in a path of the semi-truck 200. In some aspects, one or more lidars 114 and radar 116 sensors may be positioned on the vehicle to sense or detect the presence and volume of objects proximate to or in the path of the semi-truck 200. Other sensors may also be positioned or mounted at various locations of the semi-truck 200 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 200. For example, images and location information may be processed to identify or detect objects around or in the path of the semi-truck 200 and control signals may be transmitted to adjust throttle 184, steering 186, and/or brakes 188 via controller(s) 182, as needed to safely operate the semi-truck 200 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 200) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 240 positioned within a sleeper compartment 212 of the semi-truck as shown in FIG. 2C). Computer system 140 may be in communication with other computer systems (not shown) that might be local to and/or remote from the semi-truck 200 (e.g., computer system 140 might communicate with one or more remote terrestrial or cloud-based computer system via a wireless communication network connection).

According to various embodiments described herein, computer system 140 may be implemented as a server. In some embodiments, computer system 140 may be configured using any of a number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identify lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory to be generated by trajectory generation system 176 in real time based on interactions and predicted interactions between the semi-truck 200 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 200.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method disclosed herein. Computer system 140 is capable of being implemented and/or performing any of the functionality disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram(s) of the other figures herein. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

In some embodiments, one or more aspects, features, devices, components, and systems of computer system 140 may be accessed, provided by, or supported by cloud services made available through the internet. In some instances, the cloud services might include infrastructure, platforms, or software hosted by a third-party provider (e.g., Amazon Web Services, Microsoft Azure, Google Cloud Platform, etc.). For example, in some embodiments, at least some portion of one or more of the storage, processing, and control functions or components of computer system 140 may be provided by cloud services accessed via the internet. In some aspects, the cloud services might be implemented as Infrastructure-as-a-Service (IaaS), Platforms-as-a-Service (PaaS), Software-as-a-Service (SaaS), Function-as-a-Service (FaaS), and other cloud computing service solutions.

FIGS. 2A-2C are illustrative depictions of exterior views of a semi-truck 200 that may be associated with or used in accordance with example embodiments. Semi-truck 200 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 2A-2C. The example semi-truck 200 shown in FIGS. 2A-2C is one style of truck configuration that is common in North American that includes an engine 206 forward of a cab 202, a steering axle 214, and two drive axles 216. A trailer (not shown) may typically be attached to semi-truck 200 via a fifth-wheel trailer coupling that is provided on a frame 218 and positioned over drive axles 216. A sleeper compartment 212 may be positioned behind cab 202, as shown in 2A and 2C. FIGS. 2A-2C further illustrate a number of sensors that are positioned at different locations of semi-truck 200. For example, one or more sensors may be mounted on a roof of cab 202 on a sensor rack 220. Sensors may also be mounted on side mirrors 210, as well as other locations of the semi-truck.

Sensors may be mounted on a bumper 204, as well as on the side of the cab 202 and other locations. For example, a rear facing radar 236 is shown as being mounted on a side of the cab 202 in FIG. 2A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors above windshield 208 including a long range lidar 222, long range cameras 224, GPS antennas 234, and mid-range front facing cameras 226. Side mirrors 210 may provide mounting locations for rear-facing cameras 228 and mid-range lidar 230. A front radar 232 may be mounted on bumper 204. Other sensors (including those shown and some not shown) may be mounted or installed on other locations of semi-truck 200. As such, the locations and mounts depicted in FIGS. 2A-2C are for illustrative purposes only.

Referring now to FIG. 2C, a partial view of semi-truck 200 is shown that depicts some aspects of an interior of cab 202 and the sleeper compartment 212. In some embodiments, portion(s) of control system 100 of FIG. 1 might be deployed in a systems rack 240 in the sleeper compartment 212, allowing easy access to components of the control system 100 for maintenance and operation.

Particular aspects of the present disclosure relate to a method and system providing a framework for removing or otherwise smoothing discrepancies in altitude of mapped roads traversed by an AV (e.g., a truck similar to that disclosed in FIGS. 1 and 2A-2C). Aspects of the present disclosure provide, in general, a framework to smooth discontinuities in mapped altitudes and generate corrected maps without the altitude discontinuities accurately and efficiently.

In some aspects, a mapping and localization system for an AV use lane maps to localize the vehicle and produce a prior map for what the highway looks like. The prior map may then be modified by a map fusion system that correlates the map with the AV's camera and lidar observations of lane lines. Having at least approximately accurate altitude data supports the mapping and localization system to produce the most accurate estimate possible.

In general, lane maps consist of geometric components such as lane boundaries that indicate where the left and right boundaries of lanes are located and the lane centerline that indicates the location of an average of the lane boundaries, as well as topological components that might describe how lanes are related to one another (e.g., when lanes merge together, when lanes split apart, etc.). In some embodiments, the present disclosure is primarily concerned with the geometry of the lane boundaries and the centerlines.

Figure 3:
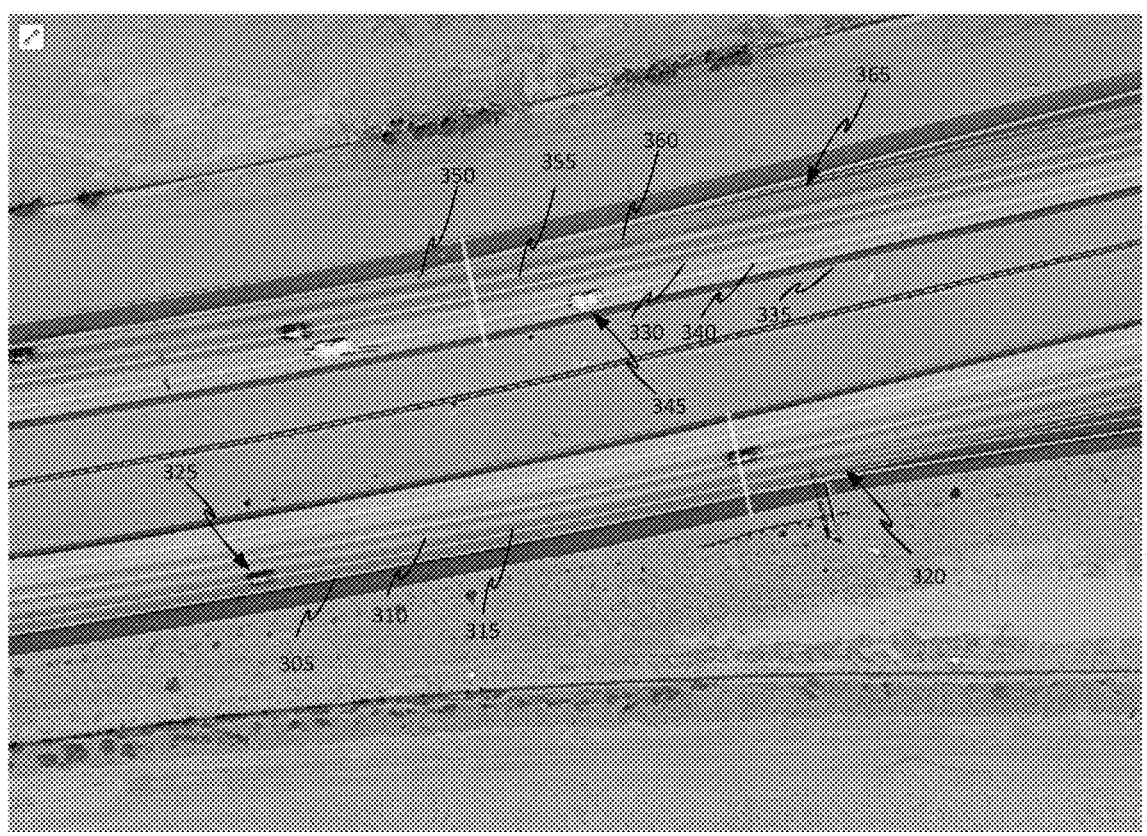
FIG. 3 is an illustrative depiction of a lane map for road on which an autonomous vehicle may operate, in accordance with an example embodiment.

FIG. 3 is an illustrative depiction of a road 300 on which an autonomous vehicle may operate, in accordance with an example embodiment. Road 300 includes multiple lanes for traffic, each defined by lane boundaries and a centerline therebetween. For example, lane boundaries 305 and 310 with centerline 315 (shown splitting at 320 for vehicle 325 travelling left to right) define one traffic lane, lane boundaries 330 and 335 with centerline 340 define another traffic lane travelled by vehicle 345, and lane boundaries 350 and 355 with centerline 360 (shown having merged at 365 for the traffic travelling right to left) define yet another traffic lane.

In some instances, a lane map (whether self-generated, edited, or provided by a mapping service, platform, vendor, or other source) might typically specify lane features in terms of latitude, longitude, and altitude, and be accurate to within a few meters. An autonomous driving system may be capable of adjusting a lane map in order to overcome typical map errors (e.g., ±50 centimeters). In some aspects, an AV system may use the altitude information of a lane map to produce accurate estimates regarding a road and the AV's relative location therewith, as well as properly process road features such as overpasses and interchanges where roads go over or under one another.

While the lane maps initially self-generated, edited, or provided by a mapping service, platform, vendor, or other source might generally include high quality altitude data for most places represented by the lane maps, there might be areas of the lane maps that have an altitude error that is significantly higher than normal or expected. These areas of significantly high altitude error may typically manifest as a "kink" discontinuity or a "step" discontinuity. These (and other types) of altitude discontinuities may appear for a number of reasons, including for example, map editing errors, quality assurance oversights, poor data collection, etc.

Figure 4A:
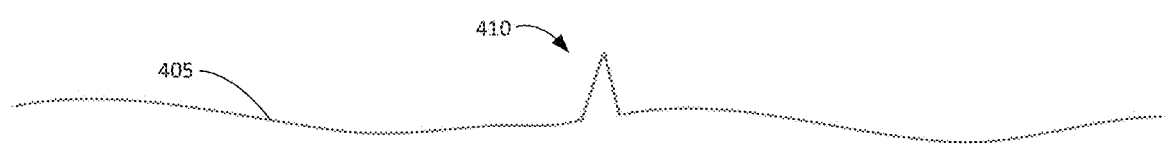
FIG. 4A is an illustrative depiction of a first type of discontinuity in mapped altitude for a lane map, in accordance with an example embodiment.
Figure 4B:
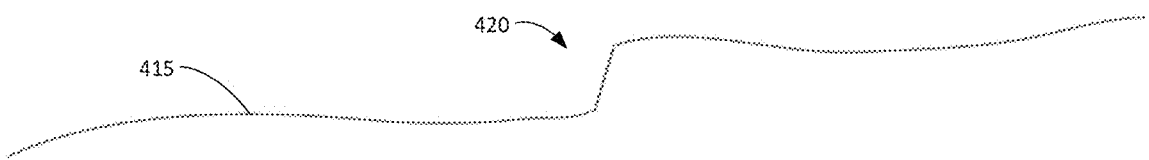
FIG. 4B is an illustrative depiction of a second type of discontinuity in mapped altitude for a lane map, in accordance with an example embodiment.

FIG. 4A is an illustrative depiction of a kink type of discontinuity in lane map of a road, in accordance with an example embodiment. As shown, FIG. 4A includes an illustrative representation of a road 405 having a relatively sharp bump or spike (i.e., kink) discontinuity at 410, where the altitude level abruptly increases from a first level to a higher second level and then substantially returns to the first level. FIG. 4B is an illustrative depiction of a step type of discontinuity in mapped altitude for a road, in accordance with an example embodiment. As seen, FIG. 4B includes an illustrative representation of a road 415 having a step-like discontinuity at 420, where the altitude level abruptly rises to a higher level. In some instances, a step discontinuity may be exhibited by a lane map (not shown) wherein the altitude level abruptly decreases from a first level to a lower level.

The discontinuities depicted in FIGS. 4A and 4B may prohibit an initial map from being used in AV operations (e.g., used by a map fusion system and other systems and processes) without modification. The example discontinuities are significantly worse than typical map errors since they violate the underlying assumptions about the types of errors that might be present in the lane map. For example, a variance of about 20 centimeters in lateral position or about 1 meter in altitude might be expected in an example lane map. However, a kink discontinuity (i.e., sharp bump) or a step (i.e., cliff) discontinuity in altitude in the middle of the road is not expected or tolerable by some AV systems since the altitude changes at a rate greater than expected for a road.

In some embodiments, a system and method disclosed herein provide a mechanism to minimize, reduce, or otherwise "smooth" altitude discontinuities included in an initial lane map and generate a corrected or modified lane map having the altitude discontinuities minimized, reduced, or otherwise smoothed over.

In some embodiments, the problem of altitude discontinuities in a lane map may be addressed by using a factor graph based approach that encodes constraints associated with realistic characteristics of altitude for a lane map and uses the factor graph to solve an optimization problem (in some instances extremely large) to produce a corrected lane map, wherein the altitude discontinuities are minimized, reduced, or otherwise smoothed over. As used herein, a factor graph is a type of graph consisting of two types of nodes. The two types of nodes include variable nodes that represent quantities to be estimated and factor nodes that represent a constraint on one or more variable nodes. In some aspects, the problem of altitude discrepancies is formulated as a factor graph herein that may be translated into a nonlinear optimization problem.

Figure 5:
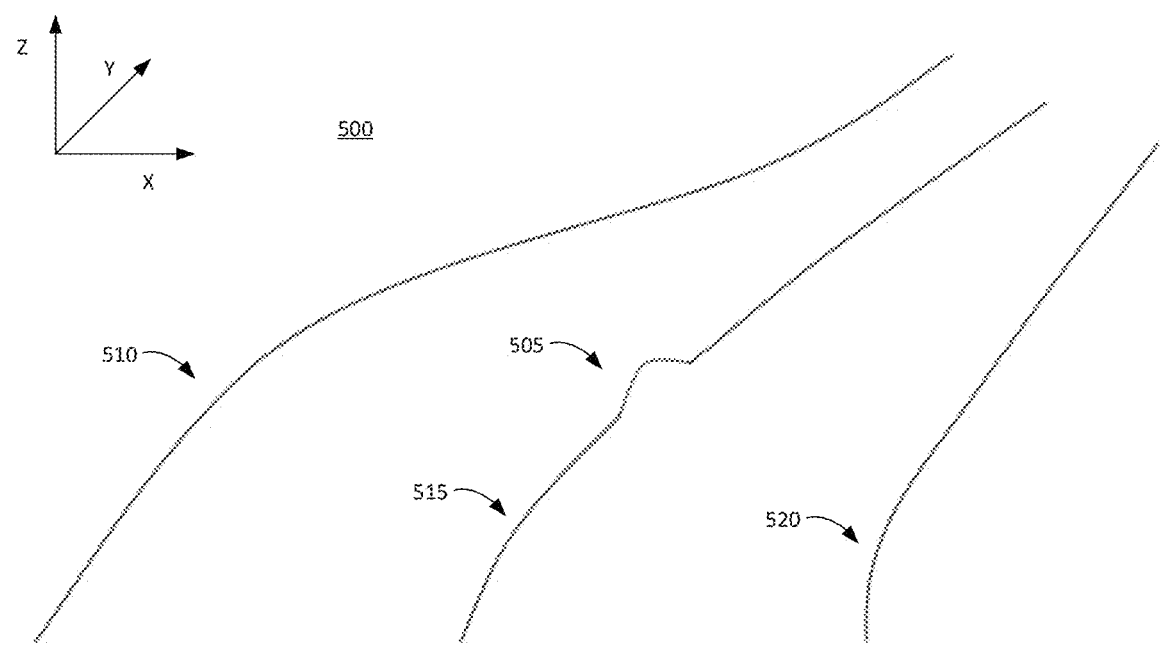
FIG. 5 is an illustrative representation of an example lane map including an altitude inaccuracy, in accordance with an example embodiment.

FIG. 5 is an illustrative representation of an example lane map 500 of a road including an altitude inaccuracy or discontinuity 505, in accordance with an example embodiment. In the example of FIG. 5, lane map 500 includes representations of the lane boundaries 510, 515, and 520 and the altitude inaccuracy 505 that may be referred to as an altitude kink.

Figure 6:
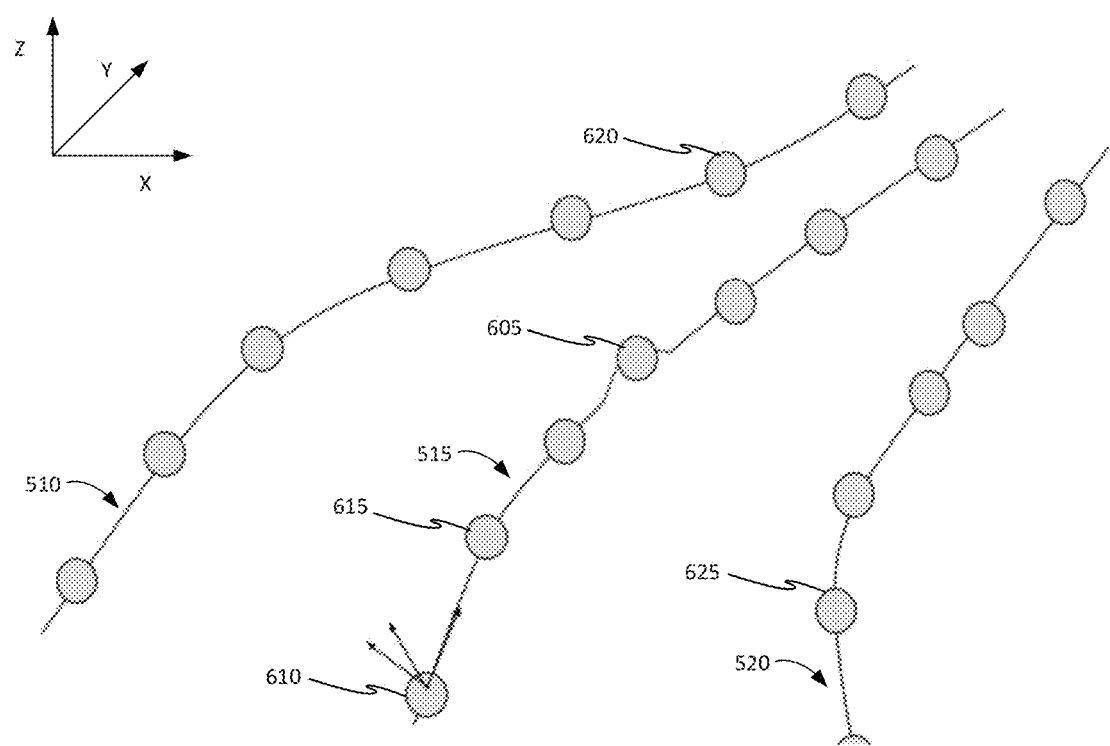
FIG. 6 is an illustrative depiction of the example lane map of FIG. 5 having the boundaries represented by a set of pose variables, in accordance with an example embodiment.

With a goal of smoothing discontinuities in the lane map 500, a factor graph is generated for the example lane map, as shown in FIG. 6, in some embodiments. The example lane map of FIG. 5 is shown in FIG. 6, where the lane boundaries are represented by a set of pose variable nodes (e.g., 605, 610, 615, 620, and 625) along the lane boundaries (e.g., 510, 515, and 520) of the lane map. In some aspects, the pose variable nodes represent the discretization of the lane boundaries, where the pose variable nodes (i.e., the variable nodes of the factor graph representation) are placed along the boundary. In some embodiments, each pose variable node is defined by six degrees of freedom (6 DOF) in geocentric coordinates, including a positional component (i.e., x, y, and z-components) and roll, pitch, and yaw components. As seen in reference to illustrative pose variable node 610, the next pose variable node (i.e., pose variable node 615) lies on the x-axis of pose variable node 610. That is, a pose variable node (e.g., pose variable node 610) is placed on a boundary (e.g., lane boundary 515) and oriented towards the next pose variable node (e.g., node 615) along the boundary.

In the context of the problem of altitude discontinuities in a lane map, the boundary pose variable nodes are the variables to be optimized. For example, referring to FIG. 6, a plurality of pose variable nodes are shown along each lane boundary and there are multiple lane boundaries (e.g., lane boundaries 510, 515, and 520). As such, a set including all of the pose variable nodes may be optimized in some embodiments of the present disclosure.

Still referring to the context of the problem of altitude discontinuities in a lane map, in some embodiments there may be three (3) different types of constraints that constrain or restrict the location of the pose variables. Continuing with the factor graph approach, the three (3) types of constraints may be represented in the form of factor nodes. Also, the constraints may be formulated to minimize the error introduced by the constrains that flattens the lane map while preserving the prior altitude of the lane map.

In accordance with an example embodiment, the three factor nodes may include (1) binary flatness constraints between neighboring nodes that enforces a "local flatness" property in the map, (2) a unary (i.e., single component) translational prior constraints placing a prior on the translational component of the pose, and (3) a GPS factor that can optionally be added to improve accuracy of the corrected altitude.

Figure 7:
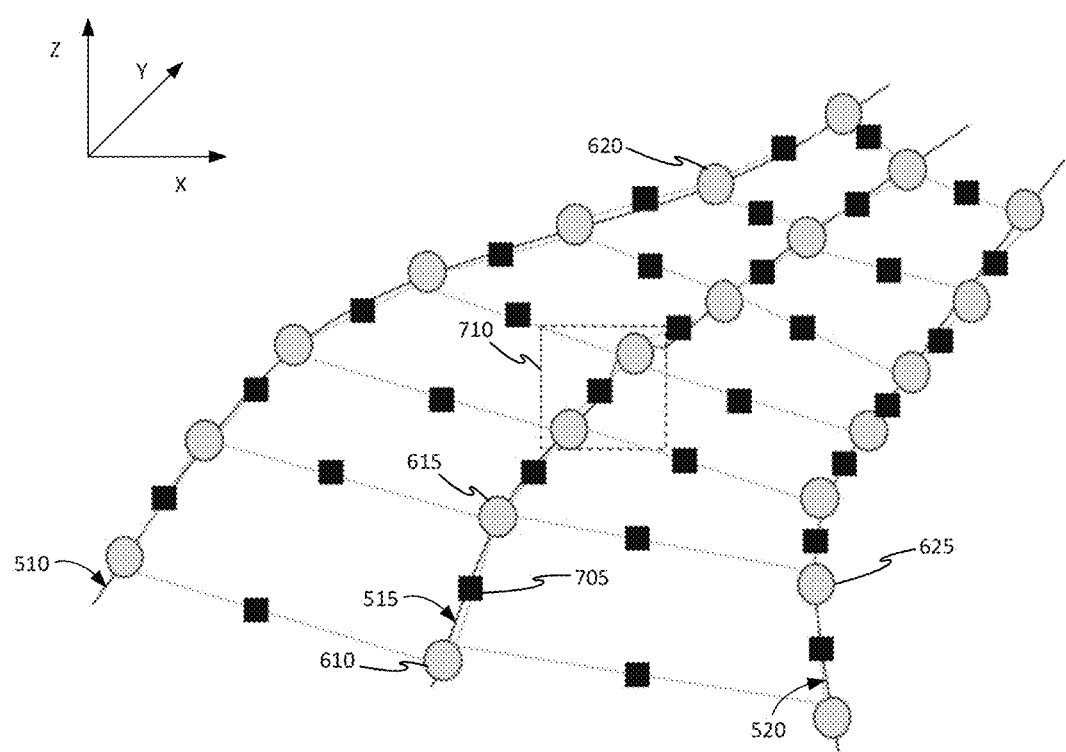
FIG. 7 is an illustrative depiction of the example lane map of FIG. 5 represented as a factor graph of the lane boundaries of the lane map, in accordance with an example embodiment.

Herein, the binary flatness constraint is placed between pairs of neighboring pose variable nodes. In some instances, each pose variable node may typically have four (4) neighbors (i.e., one neighboring pose variable node at locations forward, backward, left, and right of a subject pose variable node) that results in a grid-like layout of binary flatness constraints, as illustrated in FIG. 7. In some aspects, FIG. 7 includes an illustrative depiction of the example lane map of FIG. 5 represented as a factor graph of the lane boundaries including pose variable nodes represented as circles along the boundaries. In FIG. 7, each square between a pair of pose variable nodes represents a binary flatness constraint and the lines connecting the constraints (i.e., squares) to pose variable nodes (i.e., circles) indicates which pose variables are associated with each constraint. The flatness constraint (e.g., constraint 705) encourages the two nodes associated therewith (e.g., pose variable nodes 610 and 615) to define the same plane by forcing the relative roll, pitch, and z components to all be zero. As used herein, relative roll, pitch, and z refers to the difference in roll, pitch, and z between neighboring nodes. As such, when the relative roll, pitch, and z between nodes is zero, then there is no difference in values for the roll, pitch, and z for those two nodes. As such, these two nodes will reside on the same plane and the represented boundaries are flat.

Figure 8:
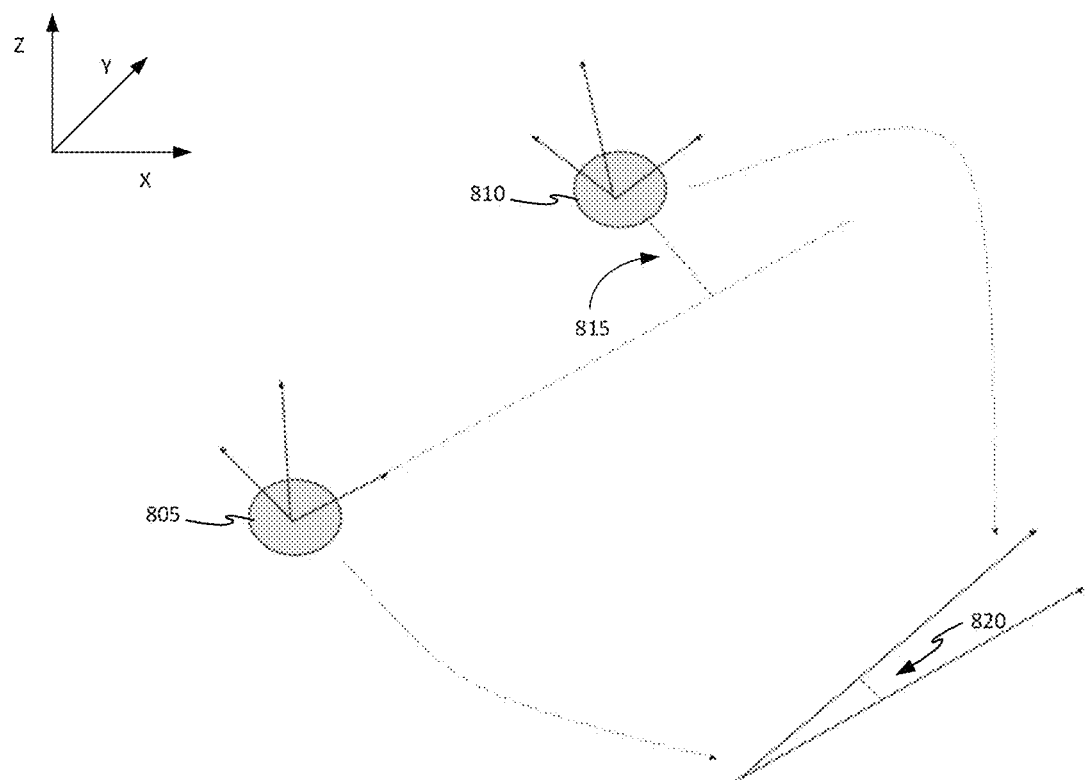
FIG. 8 is an illustrative representation of some aspects of a flatness constraint in a factor graph of the lane boundaries of a lane map, in accordance with an example embodiment.

FIG. 8 is an illustrative representation of some aspects of a binary flatness constraint in the factor graph of FIG. 7, in accordance with an example embodiment. FIG. 8 illustrates aspects of how the flatness constraint functions for the two pose variable nodes shown in box 710 of FIG. 7. In this example case, the constraint induces a penalty 815 due to the second pose variable node 810 lying about the xy-plane defined by the first pose variable node 805, and an additional penalty 820 is introduced because the relative pitch 820 between the two nodes is non-zero.

In some embodiments, the errors illustrated in FIG. 8 may be eliminated by moving the two nodes 805, 810 so that they are in the same plane. Note that while the nodes might be on the same plane, they might collectively be tilted (i.e., tilted with a slope). In some embodiments, this feature may be expressed mathematically by defining a function that computes a difference between two poses: $d(P1, P2)=(dx, dy, dz, d\_roll, d\_pitch, d\_yaw)$ and defining an objective function that is minimized when: $d(P1, P2)=(mx, my, 0, 0, 0, m\_yaw)$, where mx, my, and m_yaw are determined from the initial map and the other components are zero in order to enforce a local flatness property.

In some embodiments, in the instance no other constraints were present in a lane map, the binary flatness constraints would force the entire lane map to lie on a single plane. However, having the entire lane map on the same plane is generally undesirable since most roads have some variance in altitude at various points along the road and having the entire lane map on a single plane would typically lead to highly inaccurate global altitude values. To mitigate or moderate the tendency of the flatness constraint to force the entire map to reside on the same plane, some embodiments herein introduce the translational constraint mentioned above that functions to penalize the difference between the translational component of the original (i.e., initial) map and an altitude optimized map. In some aspects, the translational constraint might operate to urge the position of the boundary node to be as close as possible to what it was initially. In some embodiments, this aspect may be expressed mathematically by defining an objective function that is minimized when the translational components of a pose variable is equal to its initial value from the initial lane map: $(x,y,z)=(mx, my, mz)$. Note that these are unary constraints that are placed on each pose variable.

Figure 9:
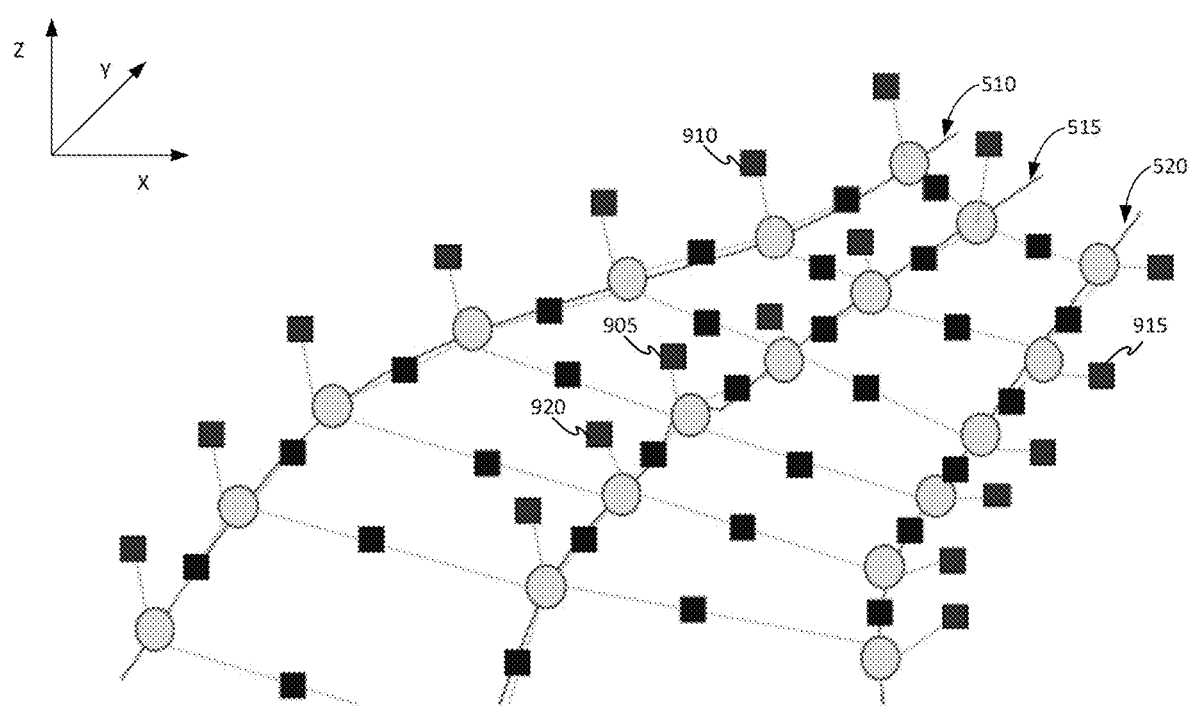
FIG. 9 is an illustrative representation of some aspects of a translational constraint in a factor graph of the lane boundaries of a lane map, in accordance with an example embodiment.

FIG. 9 is an illustrative representation of the factor graph of FIG. 7, further updated to include aspects of a translation prior constraint, in accordance with an example embodiment. Examples of a translation prior constraint, each being associated with a pose variable node is shown in FIG. 9 by, for example, illustrative translational constraints 905, 910, 915, and 920.

In some regards, the combination of the unary transitional constraint and the binary fitness constraint might introduce some error to a lane map. Although the combination of the transitional constraint and binary fitness constraint might generally operate very well to remove or reduce altitude discontinuities, the combination might introduce some error by making an area of the lane map too smooth. While a lane map corrected by the application of the transitional constraint and binary fitness constraint is generally better than an initial map having the altitude discontinuities, the error (if any) is not desirable.

In some embodiments, a third type of constraint associated with GPS data (also referred to herein as a GPS data constraint) may be added to a factor graph representation of a lane map. In some aspects, the GPS data constraint might improve the accuracy of a system or process herein by adding factors obtained from GPS data. The GPS data constraint may operate to compensate for the error (if any) attributable to the combination of the transitional constraint and binary fitness constraint. In some embodiments, use of the GPS data constraint might be optional. In the instance GPS data is obtained or otherwise accessible (e.g., a GPS equipped vehicle drives over a section of road represented by a lane map herein and a record of the collected GPS data for that section of road is accessible), the GPS data constraint may be added to the factor graph representation of the lane map to specify the road surface matches the pose indicated in the record of the collected GPS information.

Figure 10:
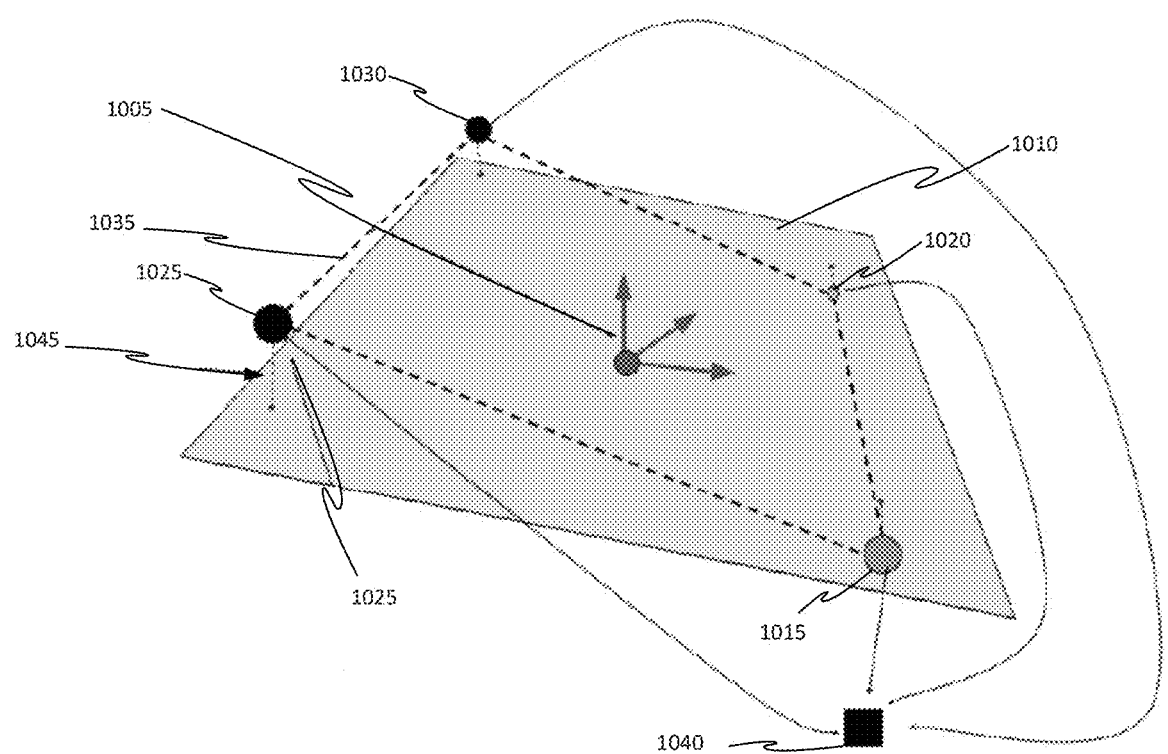
FIG. 10 is an illustrative representation of some aspects of a GPS pose constraint for a factor graph of the lane boundaries of a lane map.

FIG. 10 is an illustrative representation of some aspects of a GPS pose constraint in a factor graph of the boundaries of a lane map, in accordance with some embodiments herein. In some aspects, the recorded GPS data may include positional data (e.g., longitude and longitude coordinates), as part of 6DOF data. In the example of FIG. 10, a pose 1005 obtained, derived from, or otherwise indicated by GPS data defines a local xy-plane 1010 including the GPS data defined boundary nodes 1015 and 1020. Accordingly, the road should lie on the plane 1010 since this is the plane the road actually exists on, as indicated by the GPS data. FIG. 10 further illustrates boundary nodes 1025 and 1030, determined based on the xy-plane 1035 including those boundary nodes. A significant aspect here is that pose 1005 defines an x-y plane 1010 and the road surface 1040 should lie on that plane (because this is the actual plane the road exists on in reality, as indicated by the GPS data). The GPS data constraint penalizes how out of plane the GPS pose data 1005 is relative to the pose (in the xy-plane 1035) generated based on the combination of the transitional constraint and binary fitness constraint. With the GPS data constraint, a penalty is incurred for how out of plane the GPS x-y plane 1010 and the calculated x-y plane 1035 are and the GPS data constraint functions to bring these two planes into alignment, as depicted in FIG. 10 by, for example, the dashed line 1045.

Figure 11:
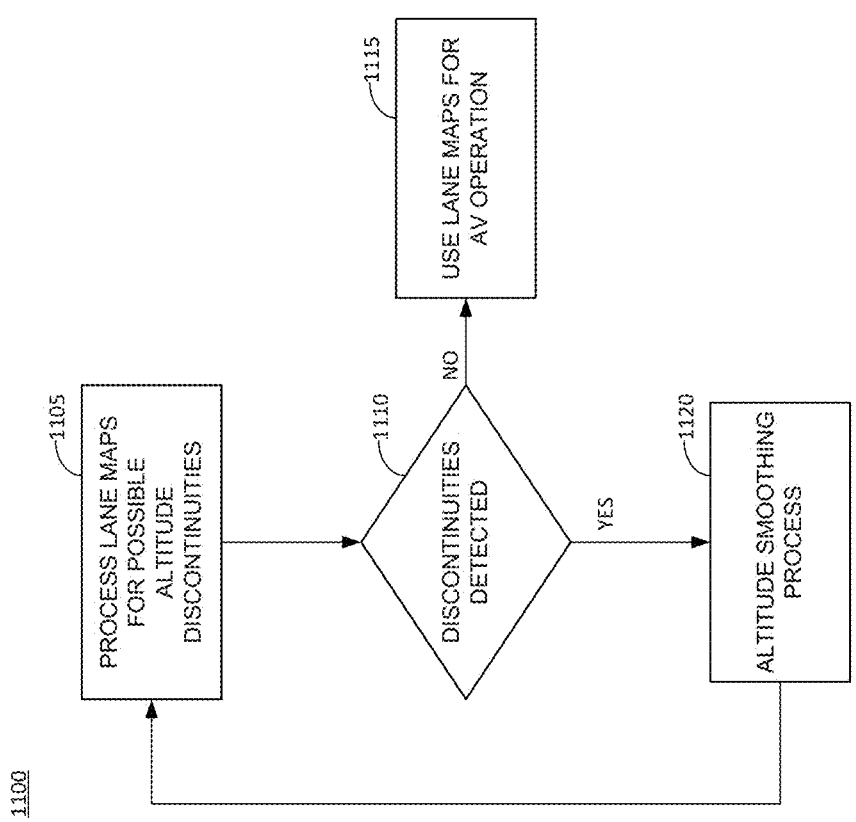
FIG. 11 is an illustrative flow diagram of a process, in accordance with an example embodiment.

FIG. 11 is an illustrative flow diagram of a process, in accordance with an example embodiment. At operation 1105, lane maps of a road or at least a segment of a road may be provided by or accessed from a lane map source (e.g., a lane map vendor, service, data store, platform as a service (PaaS) provider, data repository, data storage device, etc.) and processed to determine whether the lane map includes altitude discontinuities. The altitude discontinuities might include one or more of a kink discontinuity, a step discontinuity, or any other type of altitude discontinuity without limit.

In some embodiments, a process, system, service, application, or device might implement some aspects of operation 1105 to identify altitude discontinuities. In some instances, the process to identify altitude discontinuities may be automatically executed. For example, the process to identify altitude discontinuities (i.e., operation 1105) might be executed after the altitude smoothing process (operation 1120) to ensure that all of the altitude discontinuities have been removed from a lane map.

In some embodiments, a process to identify altitude discontinuities herein might examine a pitch for different segments of a lane map to determine whether or not the analyzed segment of the lane map includes an altitude discontinuity. In some instances, the lane boundaries of a lane map may be discretized into a plurality of segments, where the pitch between consecutive segments is analyzed. In the event that pitch is outside of some specified tolerance or threshold value, then some sort of altitude discontinuity may be indicated for the junction of the segments. In one example, the relative pitch between lane map segments should be about the same (e.g., ±10 degrees), where a greater value may indicate an altitude discontinuity.

If, at operation 1110, it is determined that no altitude discontinuities were detected in the initial lane maps processing at operation 1105, then process 1100 proceeds to operation 1115 wherein the lane map may be sufficiently accurate for use in one or more AV operation.

In the instance it is determined that altitude discontinuities were detected in the initial lane maps processing at operation 1105, then process 1100 advances from operation 1110 to operation 1120, where an altitude smoothing process as disclosed herein (e.g., factor graph-based approach) may be executed. Upon completion of the altitude smoothing process at operation 1120, the process may return to operation 1105 to determine whether any discontinuities remain in the lane map. The operations of process 1100 may iterate until there are no altitude discontinuities remaining in the lane map, for a specified or dynamically determined maximum number of times, until the corrected lane map is deemed sufficiently accurate for use in one or more AV operation (based on one or more criteria, etc.), and as otherwise specified.

Figure 12:
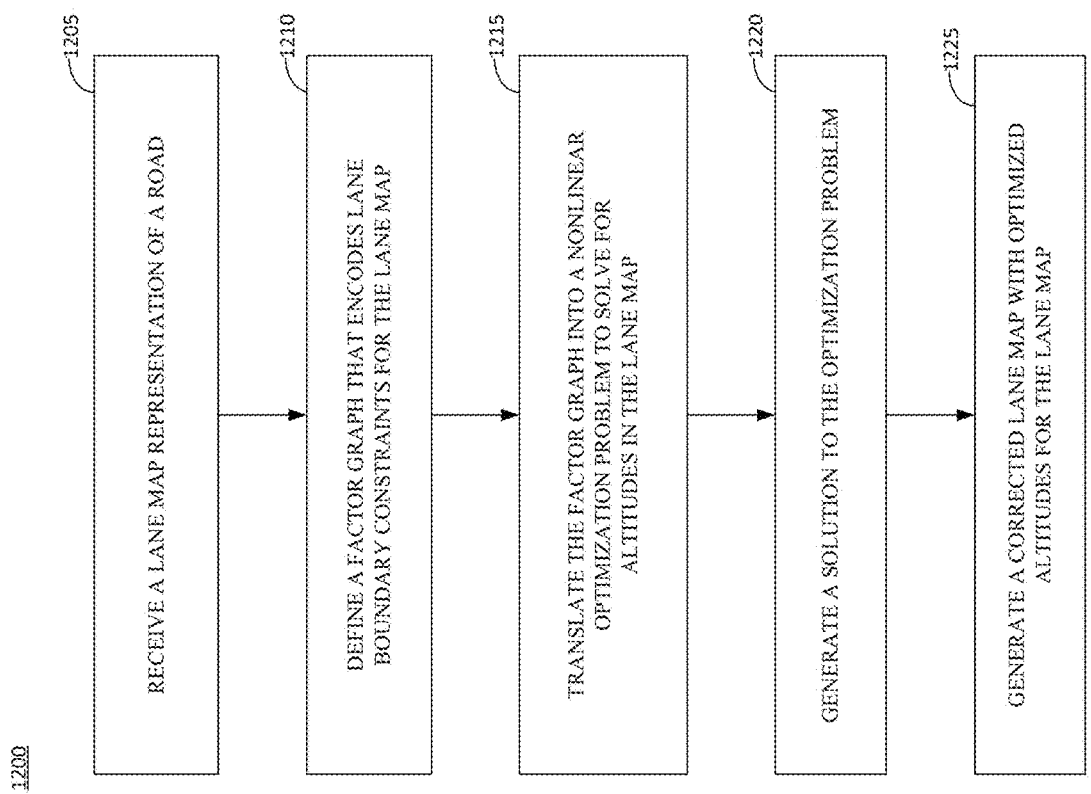
FIG. 12 is an illustrative flow diagram for an altitude smoothing process, in accordance with an example embodiment.

FIG. 12 is an illustrative flow diagram for an altitude smoothing process, in accordance with an example embodiment. In some instances, certain aspects of process 1200 are discussed in detail elsewhere in the present disclosure and might not be repeated here in the following discussion of FIG. 12.

A lane map representation of a road is received at operation 1205. The particular sourcing of the lane map might vary and is not restricted to any specific service, provider, or vendor. In some aspects, the lane map received at operation 1205 might be similar to the lane maps disclosed herein and otherwise compatible with the process operations disclosed herein.

At operation 1210, a factor graph may be defined for the lane boundaries of the received lane map. The factor graph of operation 1210 may encode lane boundary constraints including, for example, a flatness constraint, a transitional constraint, and a GPS data constraint disclosed herein, for the lane map. In some embodiments, the lane boundary constraints might include additional, alternative, fewer, and substitute lane boundary constraints as compared to lane boundary constraints explicitly disclosed herein.

Continuing to operation 1215, the factor graph of operation 1210 may be translated into a nonlinear optimization problem for the altitudes of the lane map. The nonlinear optimization problem may be formulated to incorporate the lane boundary constraints represented by the factor graph.

At operation 1220, a solution to the optimization problem of operation 1215 may be generated. In some aspects, the solution to the nonlinear optimization problem might be achieved using conventional techniques and processes. Process 1200 further advances to operation 1225 where a corrected lane map including optimized altitudes for the road is generated based on the generated solution to the optimization problem.

Figure 13:
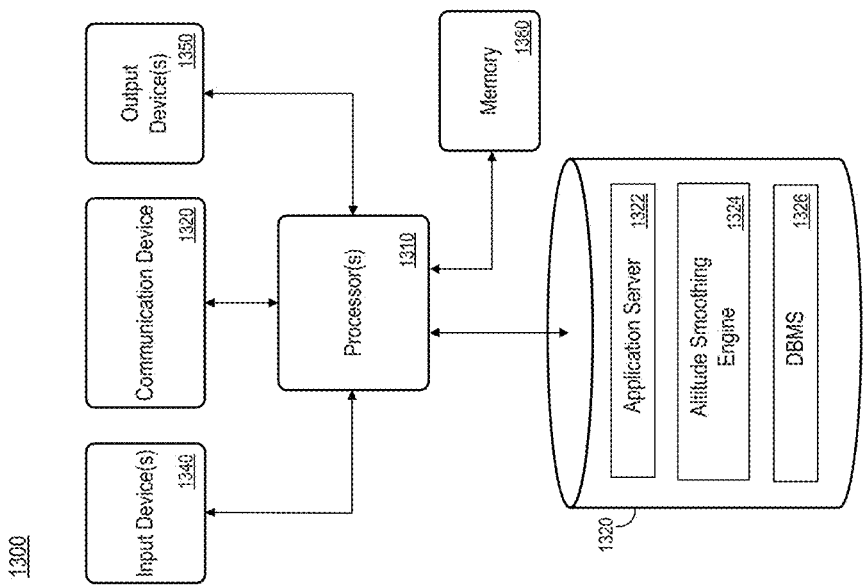
FIG. 13 is an illustrative block diagram of a computing system, in accordance with an example embodiment.

FIG. 13 illustrates a computing system 1300 that may be used in any of the architectures or frameworks (e.g., FIG. 1) and processes (e.g., FIG. 9) disclosed herein, in accordance with an example embodiment. FIG. 13 is a block diagram of computing device 1300 embodying an altitude smoothing processor, according to some embodiments. Computing system 1300 may comprise a general-purpose computing apparatus and may execute program code to perform any of the functions and processes (e.g., FIG. 11, operation 1120; FIG. 12, process 1200; etc.) described herein. Computing system 1300 may include other unshown elements according to some embodiments.

Computing system 1300 includes processing unit(s) 1310 operatively coupled to communication device 1320, data storage device 1330, one or more input devices 1340, one or more output devices 1350, and memory 1360. Communication device 1320 may facilitate communication with external devices, such as an external network, a data storage device, or other data source. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into computing system 1300 (e.g., a manual request for a specific set of AV operation associated data). Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM).

Application server 1332 may each comprise program code executed by processor(s) 1310 to cause computing system 1300 to perform any one or more of the processes described herein. Embodiments are not limited to execution of these processes by a single computing device. Data storage device 1330 may also store data and other program code for providing additional functionality and/or which are necessary for operation of computing system 1300, such as device drivers, operating system files, etc. The altitude smoothing engine 1334 may include program code executed by processor(s) 1310 to determine, in response to input (initial) lane map data, a corrected lane map without any altitude discontinuities therein. Results generated by the altitude smoothing engine 1334 may be stored in a database management system node 1336.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A vehicle computing system, comprising:
   a memory storing computer instructions; and
   a processor communicatively coupled with the memory to execute the instructions, capable of:
      receiving a digital representation of a road that includes one or more lane representations;
      processing a first segment of the digital representation of the road and determining that no altitude discontinuity exists in the first segment;
      using the first segment of the digital representation of the road for vehicle operation;
      processing at least a second segment of the digital representation of the road and determining that an altitude discontinuity exists in the second segment;
      processing the at least second segment of the digital representation of the road to substantially remove the altitude discontinuity and to generate a modified second segment of the digital representation of the road; and
      using the modified second segment of the digital representation of the road for vehicle operation.

2. The system of claim 1, wherein processing the at least second segment of the digital representation of the road further comprises:

defining a factor graph including variable nodes and constraint nodes that encode lane boundary constraints for a lane map;

translating the factor graph into a nonlinear optimization problem for altitudes of the lane map;

generating a solution to the optimization problem; and generating the modified second segment of the digital representation of the road with an optimized altitude for the road based on the generated solution.

3. The system of claim 2, wherein the lane boundary constraints include a translational constraint and a binary flatness constraint.

4. The system of claim 3, further comprising an additional constraint defined by a vehicle derived Global Positioning System (GPS) data including information indicative of an altitude component for the lane map.

5. The system of claim 3, wherein the binary flatness constraint is associated with two neighboring variable nodes and encourages the two nodes associated therewith to define a same plane by specifying a relative roll, pitch, and z components of each of the two variable nodes to be zero.

6. The system of claim 3, wherein the translational constraint is minimized when translational components of a variable node is equal to its initial value from the lane map.

7. The system of claim 2, wherein the variable nodes of the factor graph represent pose variables for the lane boundaries of the lane map.

8. The system of claim 7, wherein the pose variables are defined by parameters representing six degrees of freedom.

9. A method comprising:

receiving a digital representation of a road that includes one or more lane representations;

processing a first segment of the digital representation of the road and determining that no altitude discontinuity exists in the first segment;

using the first segment of the digital representation of the road for vehicle operation;

processing at least a second segment of the digital representation of the road and determining that an altitude discontinuity exists in the second segment;

processing the at least second segment of the digital representation of the road to substantially remove the altitude discontinuity and to generate a modified second segment of the digital representation of the road; and using the modified second segment of the digital representation of the road for vehicle operation.

10. The method of claim 9, wherein processing the at least second segment of the digital representation of the road further comprises:

defining a factor graph including variable nodes and constraint nodes that encode lane boundary constraints for a lane map;

translating the factor graph into a nonlinear optimization problem for altitudes of the lane map;

generating a solution to the optimization problem; and generating the modified second segment of the digital representation of the road with an optimized altitude for the road based on the generated solution.

11. The method of claim 10, wherein the lane boundary constraints include a translational constraint and a binary flatness constraint.

12. The method of claim 11, further comprising an additional constraint defined by a vehicle derived Global Positioning System (GPS) data including information indicative of an altitude component for the lane map.

13. The method of claim 11, wherein the binary flatness constraint is associated with two neighboring variable nodes and encourages the two nodes associated therewith to define a same plane by specifying a relative roll, pitch, and z components of each of the two variable nodes to be zero.

14. The method of claim 11, wherein the translational constraint is minimized when translational components of a variable node is equal to its initial value from the lane map.

15. The method of claim 10, wherein the variable nodes of the factor graph represent pose variables for the lane boundaries of the lane map.

16. The method of claim 15, wherein the pose variables are defined by parameters representing six degrees of freedom.

17. A non-transitory medium having processor-executable instructions stored thereon, the medium comprising:

instructions to receive a digital representation of a road that includes one or more lane representations;

instructions to process a first segment of the digital representation of the road and determine that no altitude discontinuity exists in the first segment;

instructions to use the first segment of the digital representation of the road for vehicle operation;

instructions to process at least a second segment of the digital representation of the road and determine that an altitude discontinuity exists in the second segment;

instructions to process the at least second segment of the digital representation of the road to substantially remove the altitude discontinuity and to generate a modified second segment of the digital representation of the road; and instructions to use the modified second segment of the digital representation of the road for vehicle operation.

18. The medium of claim 17, wherein the instructions to process the at least second segment of the digital representation of the road further comprise:

instructions to define a factor graph including variable nodes and constraint nodes that encode lane boundary constraints for a lane map;

instructions to translate the factor graph into a nonlinear optimization problem for altitudes of the lane map;

instructions to generate a solution to the optimization problem; and instructions to generate the modified second segment of the digital representation of the road with an optimized altitude for the road based on the generated solution.

19. The medium of claim 18, wherein the lane boundary constraints include a translational constraint and a binary fairness constraint.

20. The medium of claim 19, further comprising an additional constraint defined by a vehicle derived Global Positioning System (GPS) data including information indicative of an altitude component for the lane map.

* * * * *